United States Patent [19]

Takasugi et al.

[11] Patent Number: 4,847,822
[45] Date of Patent: Jul. 11, 1989

[54] OPTICAL INFORMATION RECORDING AND REPRODUCING APPARATUS WITH TRACKING CONTROL BY SAMPLING

[75] Inventors: Wasao Takasugi, Higashiyamato; Seiji Yonezawa, Hachioji; Toshiaki Tsuyoshi, Kokubunji; Masatoshi Ohtake, Ome, all of Japan

[73] Assignee: Hitachi, Ltd., Tokyo, Japan

[21] Appl. No.: 71,347

[22] Filed: Jul. 9, 1987

[30] Foreign Application Priority Data

Jul. 11, 1986 [JP] Japan ................. 61-161845

[51] Int. Cl.[4] .................. G11B 7/00; G11B 21/10
[52] U.S. Cl. ................................................. 369/44
[58] Field of Search ............ 369/43, 44, 45, 54, 369/56

[56] References Cited

U.S. PATENT DOCUMENTS 4,761,773  8/1988  Okada et al. ................ 369/44

Primary Examiner—William L. Sikes
Assistant Examiner—Robert E. Wise
Attorney, Agent, or Firm—Antonelli, Terry & Wands

[57] ABSTRACT

An optical information recording and reproducing apparatus of a sampling servo system which effects the tracking by holding the differential output of the reproduced signals of tracking pits that are wobbled toward the right and left relative to the track of the optical disk. Reproduced signals of a plurality of pits arranged maintaining a distance on the track and wobbled toward the right or left in a servo signal region, are compared with each other to detect any abnormal condition in the tracking pits. When the abnormal condition is detected, the tracking signal that is sampled is not used, but instead the tracking signal sampled under the normal condition is continuously used to perform the tracking control.

10 Claims, 3 Drawing Sheets

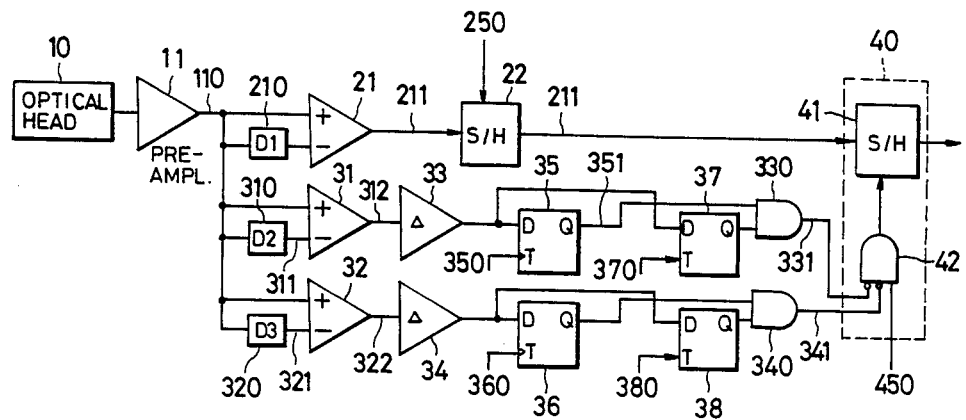
FIG. 5
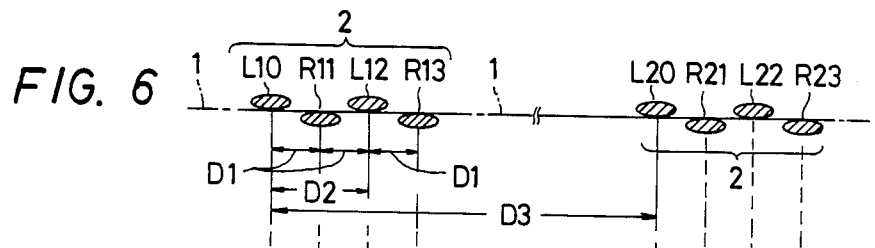
FIG. 6
FIG. 7A 250
FIG. 7B 350
FIG. 7C 370
FIG. 7D 360
FIG. 7E 380
FIG. 7F 450
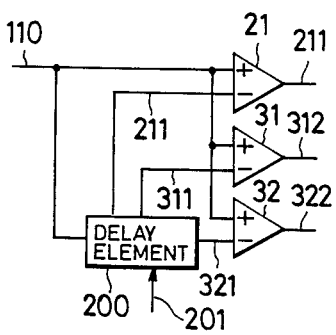
FIG. 8

OPTICAL INFORMATION RECORDING AND REPRODUCING APPARATUS WITH TRACKING CONTROL BY SAMPLING

BACKGROUND OF THE INVENTION (i) Field of the Invention

The present invention relates to an optical disk system, and particularly to a sampling servo system which controls the focusing and tracking of the optical disk relying upon servo signals that are intermittently obtained.

(ii) Prior Art

An optical disk device which reads and writes data onto a given recording region on the optical disk requires a function for controlling the light beam spot so that it properly falls on a desired position on the disk, i.e., requires a function for controlling the focusing and tracking.

There has been proposed a sampling servo system in which servo signal regions with a mark for focusing and tracking are intermittently arranged on the track, and the signals from the servo signal regions are sampled to control the focusing and tracking, as has been disclosed, for example in U.S. Pat. No. 4,564,929. This system is advantageous in that the focusing and tracking are executed based solely upon predetermined regions on the track, and the focusing and tracking servo systems are not affected by the condition of the optical disk system or by the condition on the track such as the condition for reading or writing the data on the portions (data region) other than the above-mentioned particular regions.

It has also been known that the device can be so constructed as will not be affected by relative deviation between the optical axis of the light spot and the disk surface or by inclinations thereof, if there are employed marks or wobbled pits that are recorded being deviated toward the right and left relative to the center of the track as references of tracking signals. Devices of this type have been taught in U.S. Pat. Nos. 4,364,118 and 4,443,870.

The above mentioned prior art is based on a prerequisite that the servo signals are properly detected, and no consideration has been given with regard to the probability that the servo signals may be erroneously detected due to defects that in practice exist in many number on the disk or due to any other error. In the sampling system, error that happens to be contained in a detected sample value is not corrected until the time of the next sampling. Therefore, the effect of error appears as a serious disturbance for the control characteristics often making it difficult to fulfill predetermined performance.

SUMMARY OF THE INVENTION

An object of the present invention is to obtain an optical disc device which guarantees proper control characteristics even for the defects on a disk, by employing means which detects or determines as error the erroneous detection of servo signals caused by the defects.

The feature of the present invention is not to detect an abnormal condition in the tracking signals detected relying upon the difference of reproduced signals from the tracking pits that are wobbled toward the right and left, but is to monitor the abnormal conditions in the individual tracking pits. If mentioned more concretely, the present invention has differential detection means which differentially detects reproduced signals among the pits that are wobbled in the same direction, and determines whether the tracking pits are proper or abnormal depending upon whether the differential output is proper or not. According to this structure, the presence or absence of an abnormal condition due to defects can be determined by taking into consideration the moments at which the light beam spot passes through the wobbled pits, irrespective of the tracking control condition, i.e., irrespective of whether the light beam spot exists on the track or whether the tracking control system is in operation or not. In the case of an abnormal condition, procedure is taken immediately to discontinue the use of tracking signals detected by the difference between the tracking pits wobbled toward the right and left, and the tracking control is carried out using a proper tracking signal that was detected in the previous time and that was sampled, making it possible to properly continue the control operation. Further, even for a region that contains defects to a serious degree, the time at which the defective region is passed over can be determined.

BRIEF DESCRIPTION OF THE DRAWINGS

FIGS. 4 and 5 are circuit diagrams of the embodiment;

FIGS. 6 and 7A to 7F are timing charts illustrating the structure of tracking pits and operation timings according to the embodiment;

FIGS. 8 and 9 are circuit diagrams according to further embodiments; and

FIGS. 10 and 11A to 11D are timing charts ilustrating the operation timings at each of the portions of FIG. 9.

DESCRIPTION OF THE PREFERRED EMBODIMENTS

Figure 1:
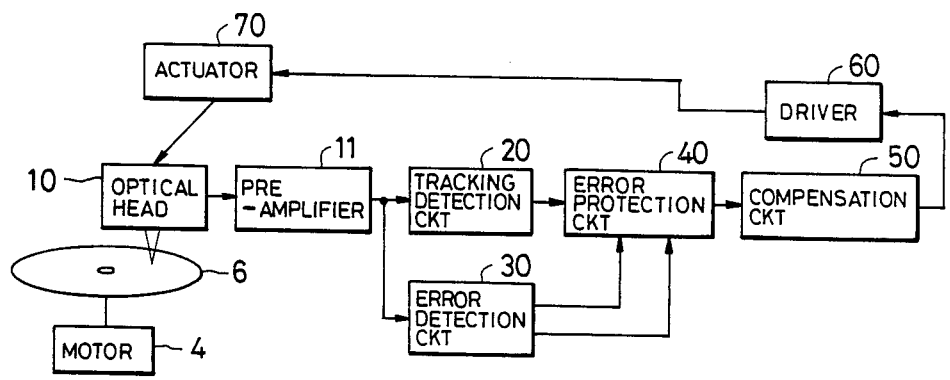
FIG. 1 is a block diagram which illustrates major portions according to an embodiment of the present invention.
Figure 2:
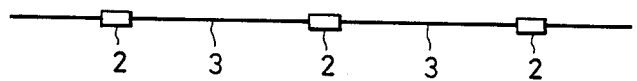
FIG. 2 illustrates the structure of a track on an optical disk according to the embodiment.

FIG. 1 chiefly illustrates a tracking servo system in the structure of an optical disc system according to an embodiment of the present invention. An optical disk 6 driven by a motor 4 has a multiple circle-like or spiral tracks for storing the data. FIG. 2 illustrates the structure of a track on the optical disk, in which a servo signal region 2 and a subsequent data region 3 are alternatingly arranged. In the servo signal region 2 are stored in advance the data for controlling the tracking as will be described later. The tracking control is effected relying upon the data from the servo signal region to write the data onto the subsequent data region or to read the data therefrom.

Reverting to FIG. 1, reference numerals 10 to 70 denote a tracking servo system. A reproduced signal from an optical head is amplified through a preamplifier 11, and is guided to a tracking signal detection circuit 20 and to an error detection circuit 30. A tracking signal detected by the tracking signal detection circuit is guided to a driver 60 via a compensation circuit 50 having a predetermined transfer function to improve characteristics of the control system. Reference numeral 70 denotes an actuator which controls the relative position of the light spot of the optical head 10 in response to a drive signal from the driver 60 thereby to control the tracking. In this structure, the error detection circuit 30 and an error protection circuit 40 have features characteristic to the present invention that are not found in the conventional apparatus.

Described below is how to control the tracking relying upon wobbled pits employed in this embodiment.

Figure 3A:
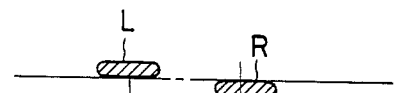
FIGS. 3A to 3C are diagrams of waveforms showing the principle for controlling the tracking according to the embodiment.
Figure 3B:
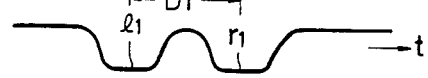
Figure 3C:
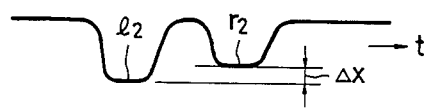
Figure 4:
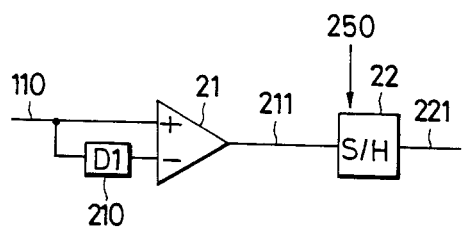

The wobbled pits are deviated by small amounts toward the right and left with the center of a track as shown in FIG. 3A. The deviation of the position of the light spot from the center of the track is obtained from signals detected at the wobbled pits. FIG. 3B shows reproduced signals at the time when the light spot passes through the center of the track: the reproduced signals have an equal amplitude $l_1$, $r_1$ for the pits L and R deviated toward the left and right When the light spot is deviated toward the left side relative to the center, the reproduced signals have such amplitudes that $l_2 > r_2$ as shown in FIG. 3C. A difference $\Delta x$ in the amplitude is detected as a tracking signal, and the tracking servo system works so that the difference $\Delta x$ will approach zero. The difference $\Delta x$ can be detected by using a differential detection system shown in FIG. 4 which uses a delay element 210 that corresponds to a distance D1 between the two pits L and R, to take out through a differential amplifier 21 the difference between the signal that has passed through the delay element and the signal that has not passed therethrough. That is, a sample holding circuit 22 assumes the sampling mode in response to a timing signal 250 that indicates the moment at which the light spot has reached the central position of the pit R, and whereby the output 211 of the differential amplifier 21 is sampled. In other periods, the output 211 is held. The circuit 22 then produces a tracking signal 221 corresponding to the difference $\Delta x$. However, in case the tracking pit L or R is deformed due to defects in the disk, the amplitudes of the reproduced signals l and r do not reflect properly the tracking condition, and an error is contained in the differential output.

FIG. 5 illustrates in detail the tracking detection circuit 20 and the error detection circuit of the embodiment of FIG. 1. The tracking detection circuit 20 is constituted quite in the same manner as that of FIG. 4. That is, the output 110 of the pre-amplifier 11 is input to one input terminal of a differential amplifier 21, and the other input terminal of the differential amplifier receives a signal via the delay element 210 having a delay quantity that corresponds to the distance between the two pits R and L. The output signal 211 of the differential amplifier 21 is sent to the sample and hold circuit 22. In this embodiment as shown in FIG. 6, two pairs of tracking pits (L10, R11) and (L12, R13) are provided on one servo signal region 2 on the track of the optical disk, to increase the precision for detecting error. Therefore, the sampling timing of the sample and hold circuit takes place at a moment when the light spot passes through the center of R11 (or R21) and R13 (or R23). FIG. 7A shows timing signals 250 that give sampling timings to the sample and hold circuit 22. The timing signals 250 are formed relying upon reproduced signals from timing pits (not shown) on the optical disk.

In FIG. 5, elements 31, 32, 33, 34, 35, 36, 37, 38, 310, 320, 330 and 340 constitute the error detection circuit 30.

The delay elements 310, 320 and differential amplifiers 31, 32 so work as to obtain differences in the reproduced signals between the tracking pits corresponding to distances D2 and D3 shown in FIG. 6. That is, a differential circuit consisting of the delay line 310 and the differential amplifier 31 works to obtain a difference between the pits deviated on one side in one servo signal region as represented by L10 and L12. A differential circuit consisting of the delay line 320 and the differential amplifier 32 works to obtain a difference between the pits that are arranged at corresponding positions between the neighboring servo signal regions as represented by L10 and L20. Under the ordinary tracking condition, deviation in position (i.e., tracking deviation) between the light spot and the track changes very little not only in a given servo signal region but also between the neighboring servo signal regions. Therefore, if there is no error, the above-mentioned two differential outputs are nearly zero, i.e., the outputs 312 and 322 of FIG. 5 are nearly zero. If either one of these outputs is not zero, however, it is so determined that an error exists. Therefore, the outputs of the differential amplifiers 31 and 32 are input to comparators 33 and 34 which compare the outputs of 31 and 32 respectively with a value $\Delta$, and the former output is determined by the flip-flops 35 and 37, and the latter output is determined by the flip-flops 36 and 38. Reference numerals 350 and 370 denote timing signals that give set timings to the flip-flops 35 and 37. The timing signal 350 is generated at a moment when the light spot passes the center or the tracking pit L12 (or L22) as shown in FIG. 7B. Therefore, the output of the high level produced by the flip-flop 35 indicates that there was a difference larger than the value $\Delta$ between the read outputs of the pits L12 and L10 (or L22 and L20) which are wobbled toward the left. The timing signal 370 is generated at a moment when the light spot has passed the center of the tracking pit R13 (or R23). Therefore, the output of the high level produced by the flip-flop 37 indicates that there was a difference larger than value $\Delta$ between the read outputs of the pits R13 and R11 (or R23 and R21) which are wobbled toward the right. Outputs of these flip-flops 35 and 37 are input to an AND gate 330. With the tracking pits being compared with each other in a given servo signal region, therefore, the output 331 of the AND gate 330 serves as an error detect signal that indicates whether the tracking signal obtained in the region is abnormal or not. The timing signals 360 that give set timings of the flip-flop 36 are generated at moments when the light spot has passed through the centers of the tracking pits L10 and L12 (or L20 and L22) as shown in FIG. 7D. Further, the timing signals 380 that give set timings to the flip-flop 38 are generated at moments when the light spot has passed through the centers of the tracking pits R11 and R13 (or R21 and R23) as shown in FIG. 7E. Therefore, the output of the high level produced by the flip-flop 36 or 38 indicates that there was a difference larger than the value $\Delta$ in the read outputs between the corresponding tracking pits of the servo region read in the previous time and of the servo region read this time. Outputs of the flip-flops 36 and .38 are input to an AND gate 340. With the pits being compared with each other between the neighboring signal regions, therefore, the output 341 of the AND gate 340 serves as an error detect signal that indicates whether the tracking signal is abnormal or not.

In FIG. 5, the elements 41 and 42 form an error protection circuit that protects tracking error using error detect signals 331 and 341. To the sample and hold circuit 41 is input a tracking signal that is held by the sample and hold circuit 22. A timing signal 450 that gives a sample timing to the sample and hold circuit 41 is generated being slightly lagged behind the sample timing signal 250 of the sample and holdcircuit 22 as shown in FIG. 7F. When the servo signal region is proper, therefore, the tracking signal that is detected and held by the sample holding circuit 22 is sampled again by the sample and hold circuit 41 being slightly lagged behind and is held thereby. This signal is input to the compensation circuit 50 of FIG. 1 to carry out the tracking control in an ordinary manner. When the error detect signal 331 or 341 assumes the high level, the timing signal 450 is inhibited by an inhibit gate 42, and the sample an holdcircuit 41 does not carry out the sampling operation. If an error is detected, therefore, the sample and holdcircuit 41 continues to hold the tracking signal detected from a normal servo signal region, and the tracking control is executed by the tracking signal that is held. According to this embodiment, between the two pairs of tracking pits (L10, R11) and (L12, R13) obtained in the data region 1 of FIG. 6, the tracking signal detected by the differential of the latter pair of tracking pits (L12, R13) is always used for tracking the data region 2 under normal condition. However, when the tracking signal is properly detected from the pair of pits (L10, Rll), and when an abnormal condition is detected in the tracking signal from the pair of pits (L12, R13), the tracking control at the data region 1 is carried out by the tracking signal from the former pair, i.e., controlled by the tracking signal detected from the pair of pits (L10, R11).

According to this embodiments as described above, provision is made of two pairs of wobbled tracking pits for a servo region to supervise at all times the abnormal condition in the outputs from the tracking pits of the right side or the left side as well as the abnormal condition in the outputs from the tracking pits arranged at corresponding positions between the neighboring servo regions. When the abnormal condition is detected, use of the thus detected abnormal tracking signal is readily inhibited, and the control operation is carried out using a tracking signal that has been detected under normal condition and that has been held. Therefore, the tracking of the optical disc can be properly controlled without affected by tracking error. When a proper tracking signal is detected again, the normal tracking control operation is resumed readily.

FIG. 8 illustrates an embodiment which employs a single delay element 200 with a plurality of taps, instead of using three delay elements of FIG. 5. Furthermore, the delay element 200 may be replaced by a variable delay element such as CCD (charge coupled device) or switched capacitor circuit to vary the amount of delay depending upon the eccentricity of the disk or the rotating condition of the disk. This makes it possible to correctly sample the central point of the pairs of tracking pits to obtain the difference. In FIG. 8, reference numeral 201 denotes an operation clock input when the CCD or the switched capacitor circuit is used. The above-mentioned object can be achieved by changing the frequency of the clock signals depending upon the deviation data or the like data. The deviation data or the like data can be controlled using a system for controlling the rotation of the disk or using a deviation data memory measured using separate meams.

Figure 9:
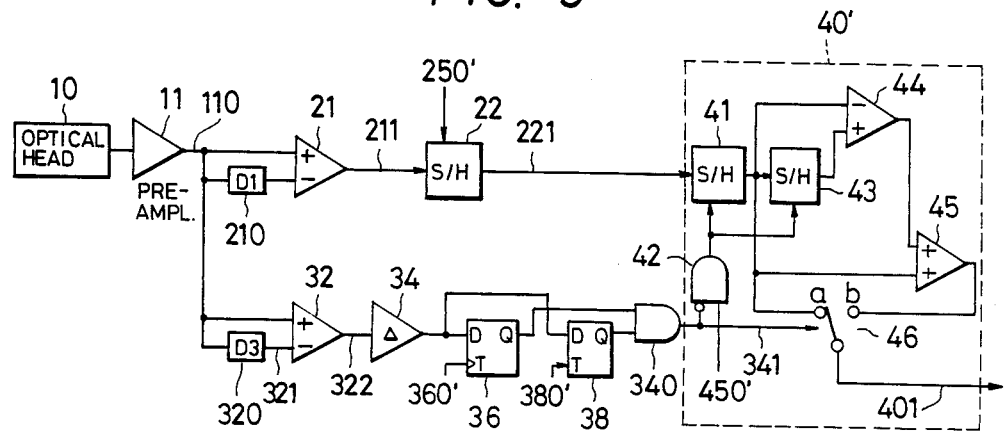
Figure 10:
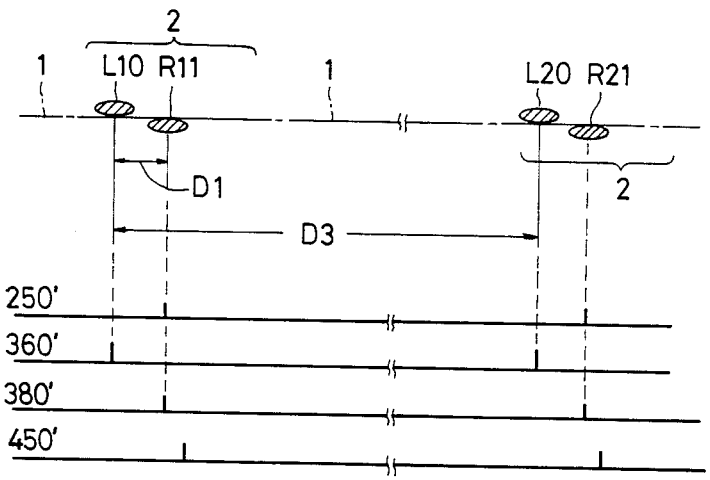

FIG. 9 illustrates a further embodiment of the present invention. This embodiment deals with the case of tracking the optical disk which is provided with a pair of tracking pits L10 and R11 or L20 and R21 that are wobbled toward the right and left in the servo signal region 2 on the track as shown in FIG. 10. Therefore, the error detection circuit of FIG. 9 does not have a circuit that compares the outputs of the tracking pits in the same servo region employed in the embodiment of FIG. 5, but has the circuit only which compares the outputs from the corresponding pits in the neighboring servo regions. The circuits 32, 34, 36, 38, 320 and 340 are constituted quite in the same manner as those of FIG. 5. A timing signal 360' that gives a timing of data set for the flip-flop 36 is generated at a moment when the light spot passes through the center of the pit L10 (or L20) as shown in FIG. 11B. A timing signal 380' that gives a timing of data set for the flip-flop 38 is generated at a moment when the light spot passes through the center of the pit R11 (or R21) as shown in FIG. 11C.

When the output 341 of the AND gate 340 that takes AND of outputs of flip-flops 36 and 38 assumes the high level, the error protection circuit 40' carries out the protection operation. Unlike the error protection circuit 40 of FIG. 5, however, the error protection circuit 40' does not directly use the tracking signal of the previous time, but produces as a tracking signal the value that is estimated by primary extrapolation from a tracking signal of the previous time and a tracking signal of two times before. Under the normal condition, the tracking signal detected by the sample and hold circuit 22 is sampled by the sample and hold circuit that performs the sampling operation in response to the timing signal 450'. At this moment, a switch 46 is connected to the side a and whereby the output of the sample and hold circuit 41 is used as a tracking signal as denoted by 401. The sample and hold circuit 43 performs the sampling operation simultaneously with the operation of the sample and hold circuit 41.

Therefore, the sample and hold circuit 43 holds the tracking signal that was detected in the previous time. If now the signal 341 assumes the high leveland if an abnormal condition is detected in the tracking pit, the timing signal 450' is inhibited at the inhibit gate 42, and the sample and hold circuits 41 and 43 maintain the holding condition. Therefore, the sample and hold circuit 41 holds the tracking signal of the previous time, and the sample and hold circuit 43 holds the tracking signal of two times before. The switch 46 is changed to the side b by the error output 341, and the output of an adder 45 appears as denoted by 401. The output of the adder 45 consists of a sum of the tracking signal of the previous time held in the sample and hold circuit 41 and the output of a subtractor 44. The output of the subtractor 44 consists of a difference between the tracking signal of two times before held in the sample and hold circuit 43 and the tracking signal of the previous time held in the sample and hold circuit 41. When an error is detected, therefore, there appears as the output 401 a tracking signal of a value estimated by the first order extrapolation from the tracking signal of the previous time and the tracking signal of two times before. This condition is maintained until the output 341 of the error detection circuit assumes the low level again and, during this time, the tracking control is carried out relying upon the extrapolated tracking signals. In this embodiment, the number of tracking bits is smaller than that of the embodiment of FIG. 5, and the data region can be broadened. Furthermore, the tracking control can be continued correctly relying upon the first order extrapolation. Here, it is allowable to so modify the circuit as to simply hold the tracking signal of the previous time as that of the embodiment of FIG. 5.

In the embodiments described thus far, furthermore, the tracking signals and error were detected by sampling the outputs reproduced at moments when the light spot has passed through the centers of pits. When it is difficult to correctly detect the timing, however, it is recommended to insert a peak holding circuit in the output side of the pre-amplifier 11 in order to sample the reproduced output which holds a peak value. It is further allowable to employ the structure which compares not only the instantaneous amplitudes of reproduced signals from the pits but also the areas of the reproduced signals. Furthermore, it is allowable to employ the structure which detects the tracking signals and error signals after the reproduced signals have been converted in digital form.

We claim:

1. An optical information recording and reproducing apparatus comprising:
   a mechanism for rotating a recording medium which has servo signal regions and data regions arranged alternatingly in the direction of rotation, each servo signal region containing at least a pair of tracking pits that are wobbled toward the right and left relative to the center of the track;
   an optical head which projects a light spot onto said recording medium and which detects the reflected light;
   tracking detection means which detects a first difference between a reproduced signal of a pit wobbled toward the left side and a reproduced signal of a pit wobbled toward the right side in each servo region among the reproduced signals sent from said optical head, and which holds said first difference as a tracking signal;
   a tracking control mechanism which controls the relative position of said light spot using said tracking signal;
   error detection means which detects a second difference in reproduced signals of a plurality of pits that are wobbled toward the same side among the reproduced signals of tracking pits sent from said optical head, and which produces a signal indicative of occurrence of an error when said second difference is larger than a threshold value; and
   error protection means which, when the output of said error detection means indicates the occurrence of an error inhibits the tracking signal produced by said tracking detection means from being used for controlling said tracking control mechanism.

2. An optical information recording and reproducing apparatus according to claim 1, wherein said error detection means detects the second difference in the reproduced signals from a plurality of pits wobbled toward the same side in a servo region.

3. An optical information recording and reproducing apparatus according to claim 1, wherein said error detection means detects the second difference in the reproduced signals among the pits that are arranged at corresponding positions in a plurality of neighboring servo regions.

4. An optical information recording and reproducing apparatus according to claim 1, wherein said error protection means continues to produce the tracking signal detected under a normal condition when the output of said error detection means indicates the occurrence of an error.

5. An optical information recording and reproducing apparatus according to claim 4, wherein said error protection means includes a sample.and holdcircuit which samples and holds an output immediately after it is produced from said tracking detection means, and an inhibit gate which, in response to the output of said error detection means, inhibits the input of a timing signal that gives a sampling timing to said sample and hold circuit.

6. An optical information recording and reproducing apparatus according to claim 1, wherein said error protection means produces a signal that is obtained by a first order extrapolation from the tracking signal obtained in a previous time and from the tracking signal obtained two times before, when the output of said error detection means indicates the occurrence of error.

7. An optical information recording and reproducing apparatus comprising:
   a mechanism for rotating a recording medium which has servo signal regions and data regions arranged alternatingly in the direction of rotation, each servo signal region containing at least a pair of tracking pits that are wobbled toward the right and left relative to the center of the track;
   an optical head which projects a light spot onto said recording medium and which detects the reflected light;
   tracking detection means which detects a first difference between a reproduced signal of a pit wobbled toward the left side and a reproduced signal of a pit wobbled toward the right side in each servo region among the reproduced signals sent from said optical head, and which holds said first difference as a tracking signal;
   a tracking control mechanism which controls the relative position of said light spot using said tracking signal;
   error detection means which detects a second difference between a reproduced signal of a pit wobbled toward the right side in a first servo region and a reproduced signal of a pit which is wobbled toward the right side in a second servo region neighboring said first servo region, and a third difference between a reproduced signal of a pit wobbled toward the left side in said first servo region and a reproduced signal of a pit which is wobbled toward the left side in said second servo region, and which produces a signal indicative of occurrence of an error when at least one of said second and third differences is larger than a threshold value; and
   error protection means which, when the output of said error detection means indicated the occurrence of an error, inhibits the tracking signal produced by said tracking detection means from being used for controlling said tracking control mechanism.

8. An optical information recording and reproducing apparatus according to claim 7, wherein said error protection means continues to produce the tracking signal detected under a normal condition when the output of said error detection mens indicates the occurrence of an error.

9. An optical information recording and reproducing apparatus according to claim 7, wherein said error protection means includes a sample and hold circuit which samples and holds an output immediately after it is produced from said tracking detection means, and an inhibit gate which, in response to the output of said error detection means, inhibits the input of a timing signal that gives a sampling timing to said sample and hold circuit.

10. An optical information and reproducing apparatus according to claim 7, wherein said error protection means produces a signal that is obtained by a first order extrapolation from the tracking signal obtained in a previous time and from the tracking signal obtained two times before, when the output of said error detection means indicates the occurrence of an error.

* * * * *